United States Patent
Christ, Jr.

[11] Patent Number: 5,218,890
[45] Date of Patent: Jun. 15, 1993

[54] KEYLESS ADJUSTABLE DRIVER

[76] Inventor: William H. Christ, Jr., 2120 St. Paul St., Baltimore, Md. 21218

[21] Appl. No.: 892,315

[22] Filed: Jun. 3, 1992

[51] Int. Cl.⁵ .......................................... B25B 13/32
[52] U.S. Cl. ...................................... 81/113; 81/116; 279/35
[58] Field of Search ................ 81/90.2–90.9, 81/94, 97–99, 111–113, 116, 121.1; 279/35–37

[56]  References Cited

U.S. PATENT DOCUMENTS

| | | | |
|---|---|---|---|
| 2,634,641 | 4/1953 | Hodges | 81/113 |
| 3,712,633 | 1/1973 | Schadlich | 279/58 |
| 4,679,468 | 7/1987 | Gray | 81/121.1 |
| 4,869,136 | 9/1989 | Easter et al. | 81/55 |
| 4,877,259 | 10/1989 | Röhm et al. | 279/123 |

Primary Examiner—D. S. Meislin
Attorney, Agent, or Firm—David Newman & Associates

[57] ABSTRACT

A keyless adjustable driver, attachable to a chuck on a drill, having a plurality of adjustable settings for holding and driving bolts with flat sides. The keyless adjustable driver includes a cylindrical body having an axial hole, a central shaft, passing through the axial hole, for attaching the driver to the chuck, a plurality of gripper arms pivotally mounted on the cylinder body for pivoting and holding the flat sides of the bolts in response to movement of the head of the central shaft engaging the gripper arms, and a wheel having a threaded axial hole for engaging screw-like threads on the central shaft to move the central shaft to close and lock the gripper arms to hold the bolt as the device rotates on the drill.

17 Claims, 7 Drawing Sheets

KEYLESS ADJUSTABLE DRIVER

BACKGROUND OF THE INVENTION

This invention relates to attachments for electric drills, and more particularly, this invention relates to drivers for bolts with flat-sided heads for attachment to a chuck on an electric drill, for driving such bolts of various sizes and shapes by providing adjustable size settings, and for permitting secure adjustments without the use of a key.

DESCRIPTION OF THE RELEVANT ART

Various electric drill attachments permit drill bits, screws, nuts, bolts, and rivets to be driven into walls, decks and the like. A chuck affixed to a drill permits the interchange and securing of drill attachments, such as drill bits for drilling as well as socket shafts to hold screws and bolts onto the attachment during driving by the drill. In the prior art, these attachments are locked on or released from the chuck by the tightening or loosening, respectively, of a locking mechanism in the chuck using a key. This has the disadvantage that, for driving a fixed sized bolt, an attachment of the proper size and width must be attached to the chuck and locked with the key subsequent to the removal from the chuck of any previously locked attachment.

An additional disadvantage of the prior art is the need for a user to carry or have available to him/her a wide assortment of sizes and shapes of attachments in order to fit a given bolt.

Also, the use of incompatible measuring systems, namely the metric system and the English system, augments the wide assortment of chuck attachments needed by a user.

A further disadvantage of the prior art is the need for an attachment which can open wide enough to hold bolts and other devices, since chucks and chuck attachments, as presently designed, cannot open wide enough, and chucks and chuck attachments generally open downward, not upward, to accept an attachment.

Another disadvantage of the prior art is the need for the user to carry or have available a key to fit the chuck on a drill in order to substitute a different attachment to the chuck. While a keyless chuck is known in the art, such a chuck still requires substitution of different attachments to the chuck in order to fit a bolt of a given size.

OBJECTS OF THE INVENTION

A general object of the invention is to provide an attachment for holding and driving bolts with flat-sided heads, as well as lag bolts, sheet metal bolts, lug nuts, rivets, and nuts on bolts, which can be adjusted to a plurality of sizes without the need of removing the attachment from the chuck.

Another object of the invention is to provide an adjustable driver which adjusts to a plurality of sizes without the need of a key.

An additional object of the invention is to provide a single adjustable driver attachment for a chuck which adjusts to a plurality of sizes to replace, with one attachment, large sets of chuck attachments in which each chuck attachment in such sets of chuck attachments has a fixed-size to fit a specific size of bolt head, lag bolt, sheet metal bolt, lug nut, rivets, or a nut on a bolt.

A still further object of the invention is to provide an adjustable driver for a chuck which fits and holds both metric sized and English sized bolts with flat-sided heads, as well as lag bolts, sheet metal bolts, lug nuts, rivets, and nuts on bolts.

Another object of the invention is to provide an adjustable driver with interchangeable gripper arms for holding bolts so that damaged gripper arms or gripper arms having different capabilities, sizes, and shapes may be replaced or substituted onto the adjustable driver.

Another object of the invention is to provide an adjustable driver capable of holding a socket set extension arm of any size.

A further object of the invention is to provide an adjustable driver capable of opening wide enough and opening upward and outward to accommodate bolts, nuts, and other attachments of any size.

Another object of the invention is to provide an adjustable keyless flat-sided bolt driver with few components for ease of manufacture and construction.

An additional object of the invention is to provide a lightweight driver for ease of use with handheld drills.

A further object of the invention is to provide a portable, hand-held driver.

SUMMARY OF THE INVENTION

According to the present invention, as embodied and broadly described herein, a keyless adjustable driver is provided which is attachable to a chuck on a drill for holding and driving a bolt having a flat-sided head of any size. It is to be understood throughout the following disclosure that the term "bolt" shall include lag bolts, sheet metal bolts, lug nuts, rivets, nuts on a bolt, or any other screw-driven fastener having a plurality of flat sides, as well as socket set extension arms having an end with flat sides.

The keyless adjustable driver includes means for attaching the keyless adjustable driver to the chuck, moving means and gripping means. The moving means moves the attaching means in two directions to a plurality of positions and locks the attaching means in one of the plurality of positions. The gripping means changes settings for gripping and holding, in response to movement of the attaching means in a first of the two directions, the flat sides of the head of the bolt. The gripping means also changes settings for releasing the bolt in response to movement of the attaching means in a second of the two directions.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference is now made in detail to the present preferred embodiments of the invention, examples of which are illustrated in the accompanying drawings, wherein like reference numerals indicate like elements throughout the several views.

Figure 1:
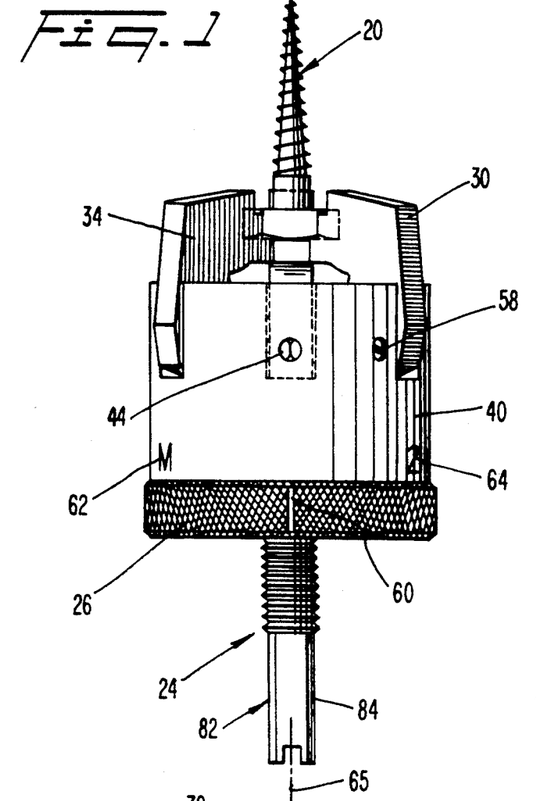
FIG. 1 shows a side view of the keyless adjustable driver according to the invention.

In the exemplary arrangement shown in FIG. 1, a keyless adjustable driver is provided which attaches to a chuck on a drill for holding and driving a bolt of any size having a plurality of flat sides. The keyless adjustable driver comprises attaching means, moving means and gripping means. In FIG. 1, by way of example, the attaching means may be embodied as a central shaft 64, the moving means may be embodied as wheel 26, and the gripping means may be embodied as gripper arms 30 for holding a bolt. The moving means engages the attaching means for moving the attaching means in two directions to a plurality of positions and for locking the attaching means in one of the plurality of positions. The gripping means engages the attaching means for changing settings in response to the moving of the attaching means in a first of the two directions, with the gripping means having surfaces for lying flush and pressuring the flat sides of the bolt, in order to grip and hold the bolt, and with the gripping means changing settings in response to the moving of the attaching means in a second of two directions to release the flat sides of the bolt.

Figure 2A:
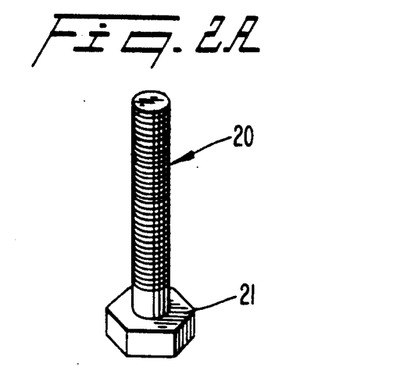
FIG. 2A shows a bolt having a head with flat sides.
Figure 2B:
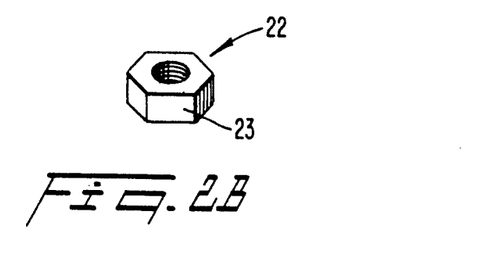
FIG. 2B shows a nut having flat sides.

FIG. 2A illustrates a bolt 20 having a head 21 with a plurality of flat sides, while FIG. 2B illustrates a nut 22 having an outer surface 23 with a plurality of flat sides. The keyless adjustable driver is capable of holding and driving either bolt 20 or nut 22 or any other screw-driven fastening with a plurality of flat sides, such as a socket set extension arm. Throughout the following disclosure, the term "bolt" includes lag bolts, sheet metal bolts, lug nuts, rivets, nuts on a bolt, or any other screw-driven fastener having a plurality of flat sides, as well as socket set extension arms having an end with flat sides.

Figure 3:
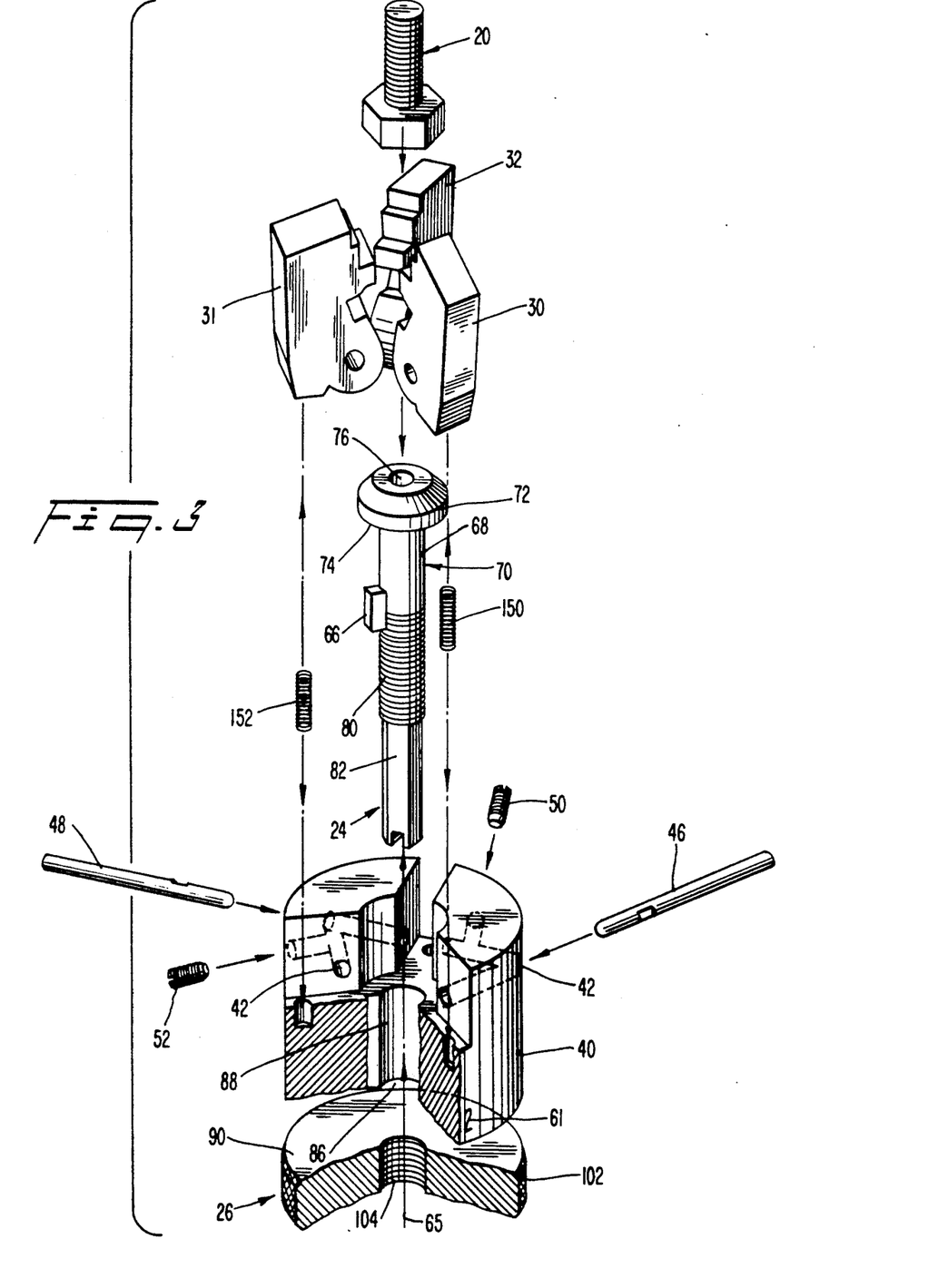
FIG. 3 illustrates a cross-sectional, exploded view of the keyless adjustable driver according to the invention.

FIG. 3 illustrates the keyless adjustable driver in a cross-sectional exploded view. As shown in FIGS. 1 and 3, the keyless adjustable driver has an axis 65 such that the entire keyless adjustable driver, when attached to a chuck and a drill by the attaching means, may rotate about the axis 65 to drive a bolt into a wall, a deck, or the like.

The keyless adjustable driver may include a cylindrical body 40 for engaging the attaching means, and mounting means for mounting the gripping means to the cylindrical body 40 and for dismounting the gripping means from the cylindrical body 40.

Figures 4A, 4B, 4C:
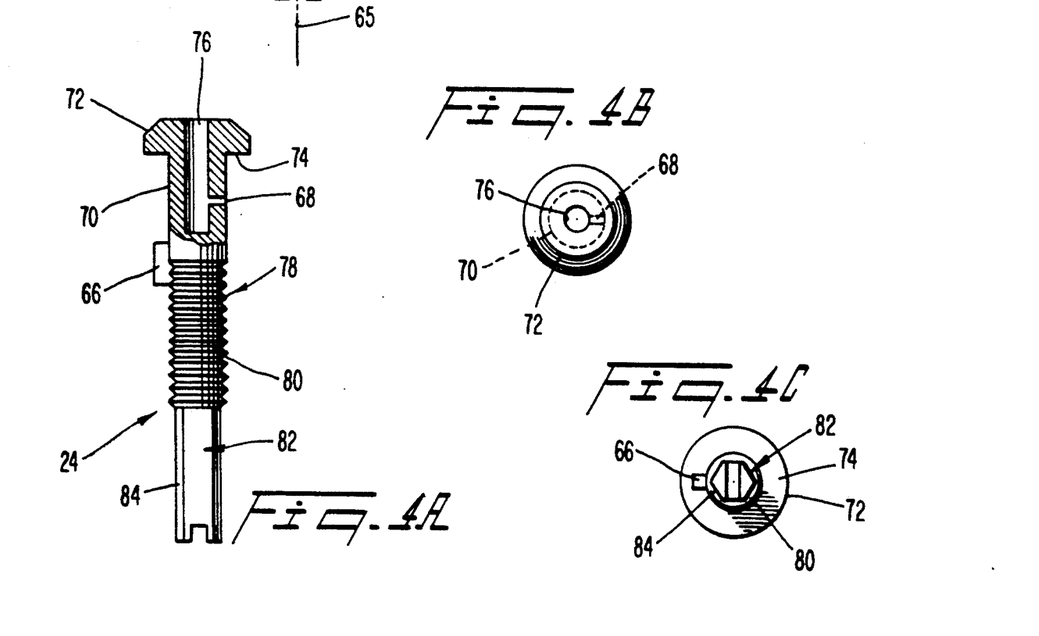
FIG. 4A shows a side view of a central shaft.
FIG. 4B shows a top view of the central shaft.
FIG. 4C shows a bottom view of the central shaft.

The attaching means is embodied as a central shaft 24, as illustrated in FIGS. 4A-4C. The central shaft 24 has an upper portion 70 with a head 72 at an upper end of the upper portion 70, and a key 66 protruding from a lower end of the upper portion 70. The head 72 has a lower edge 74, and may also include an upper opening 76 and an air vent hole 68. The central shaft 24 also has a middle portion 78 with screw-threads 80, and the central shaft 24 also has a lower portion 82, which may be embodied as a roughly three-sided stem, as shown in FIG. 4C, with sides 84 having planar surfaces for fitting the central shaft 24 onto a chuck on a drill, for allowing the central shaft 24 to rotate about the axis 65 of the keyless adjustable driver. As shown in FIG. 1, the central shaft 24 extends through the threaded axial hole 104 of the wheel 26, and the screw-threads 80 engage the threaded axial hole 104, permitting the wheel 26 to rotate about the central shaft 24 in a screw engagement.

Figure 5A:
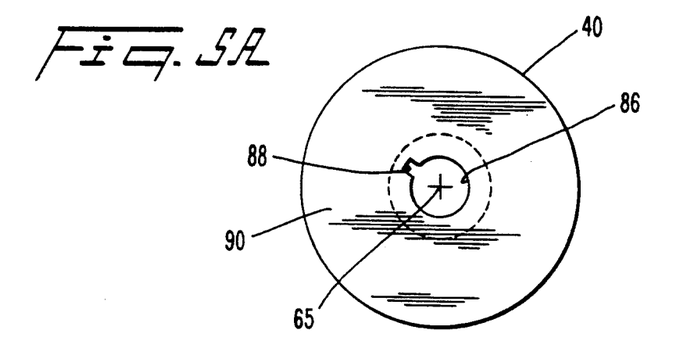
FIG. 5A shows a bottom view of a cylindrical body, having an axial hole.
Figure 5B:
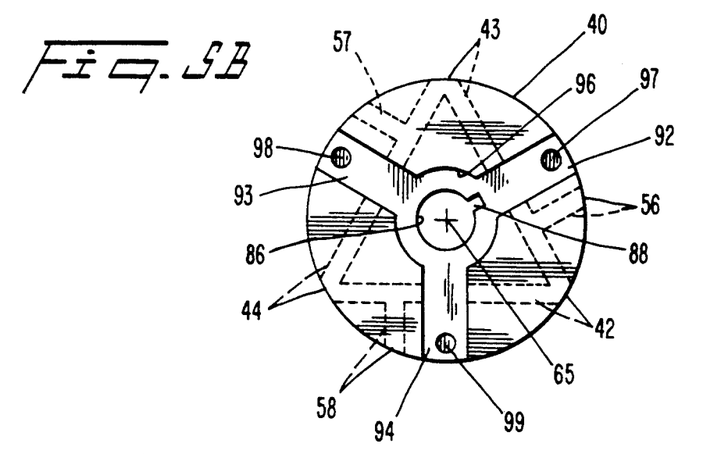
FIG. 5B shows a cross-sectional top view of the cylindrical body.
Figure 5C:
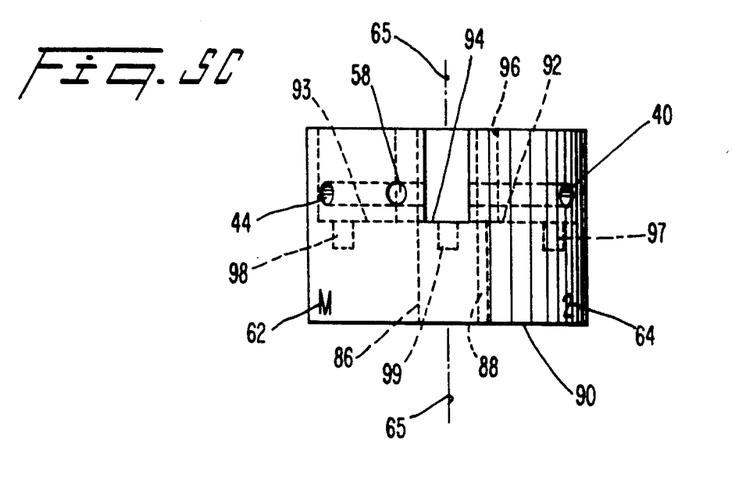
FIG. 5C shows a cross-sectional side view of the cylindrical body.

The preferred embodiment of the keyless adjustable driver may include a cylindrical body 40 with an axis aligned with axis 65 of the keyless adjustable driver, as illustrated in FIGS. 5A-5C. As illustrated in a bottom view in FIG. 5A, the cylindrical body 40 has a flat base 90 and a lower axial hole 86 which the central shaft 24 passes through, so that the central shaft 24 extends along the axis 65 through the cylindrical body 40. The cylindrical body 40 also has a slot or keyway 88, so that the key 66 of the central shaft 24 slides along the length of the keyway 88. The keyway 88 permits the central shaft 24 to move in two directions, i.e. the head 72 moves toward the flat base 90 or the head 72 moves away from the flat base 90 of the cylindrical body 40. As the lower portion 82 of the central shaft 24 is to be attached to the chuck of a drill, and as the drill and chuck rotate the central shaft 24, the key 66, engaging the keyway 88, rotates the cylindrical body 40 about the axis 65 of the cylindrical body 40 in concert with rotation of the chuck, drill, and the central shaft 24.

As illustrated in a cross-sectional top view in FIG. 5B, the cylindrical body 40 includes radial slots 92, 93, 94 which, in the preferred embodiment, are equally angularly spaced about the axis of the cylindrical body 40. In FIG. 5B, each of radial slots 92, 93, 94 includes a lower spring hole 97, 98, 99, respectively, and each of radial slots 92, 93, 94 perpendicularly crosses a corresponding one of the tubular post holes 42, 43, 44, respectively. Each of tubular post holes 42, 43, 44 extends from one side of the outer surface to another side of the outer surface of cylindrical body 40 along a chord of the cylindrical body 40. The cylindrical body 40 has screw holes 56, 57, 58 with each of the screw holes 56, 57, 58 extending from the outer surface of the cylindrical body 40 along a chord of cylindrical body 40 and terminating in the interior of cylindrical body 40 at a respective one of tubular post holes 42, 43, 44.

The lower axial hole 86 of the cylindrical body 40 connects with an upper axial hole 96. The upper axial hole 96 has a diameter greater than the diameter of the lower axial hole 86, as shown in FIG. 5C. The central shaft 24 has each of the diameters of the upper portion 70, the middle portion 78, and the lower portion 82 less than the diameter of the lower axial hole 86, except for the head 72 which has a diameter greater than the diameter of the lower axial hole 86 but less that the diameter of the upper axial hole 96. Thus, the central shaft 24 extends through the upper axial hole 96 and the lower axial hole 86 with the key 66 slidably connected to the keyway 88, while the head 72 of the central shaft 24 may move within the upper axial hole 96 as the central shaft 24 moves along the lower axial hole 86.

In a preferred embodiment, the cylindrical body 40 is made from aluminum so that the overall weight of the keyless adjustable driver is low. Aluminum permits a user to easily lift the keyless adjustable driver to a position to drive a bolt 20 held by the keyless adjustable driver into a wall, a deck, or the like, as well as to hold the keyless adjustable driver steady and to guide the keyless adjustable driver with one hand, while the other hand of the user is free to hold and control the drill to which the keyless adjustable driver is attached. Additionally, the keyless adjustable driver may be proportioned so that the cylindrical body may be easily grasped in one hand by the user for lifting, holding, and guiding the keyless adjustable driver, while the other hand of the user is free to hold and control the drill to which the keyless adjustable driver is attached. A keyless adjustable driver proportioned to a size to hold readily in one hand is suitable for residential and commercial use.

Alternate embodiments of the keyless adjustable driver may be proportioned to attach the overall keyless adjustable driver by the attaching means to industrial sized drills and/or drivers for driving larger proportioned bolts in industrial applications.

With the central shaft 24 extending through the lower axial hole 86, the central shaft 24 may include an upper opening 76 and an air vent hole 68, as illustrated in FIGS. 4A-4B. As the central shaft 24 moves along the lower axial hole 86 of the cylindrical body 40, the air vent hole 68 and upper opening 76 permit air to circulate between the central shaft 24 and the lower axial hole 86 to avoid heat buildup by friction and by movement of the central shaft 24.

Figure 8A:
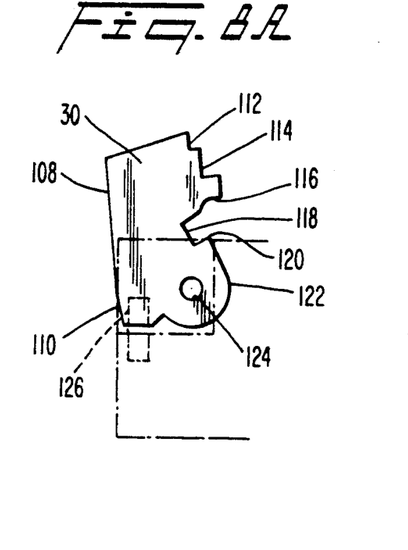
FIG. 8A shows a side view of a gripper arm.

As illustrated in FIGS. 1 and 3, the gripping means may be embodied as gripper arms 30, 31, 32 for gripping the head of a bolt 20. As shown in FIG. 8A, each gripper arm has an upper portion 108 with a first surface 112, a second surface 114, and a first edge 116, and each gripper arm also has a lower portion 110 with a spring slot 126 for positioning the gripper arm over a spring. The lower portion has a semi-circular flange 122 with a second edge 120 and a circular hole 124, with the second edge 120 of the semi-circular flange 122 and the first edge 116 of the upper portion forming a mouth 118.

Figure 7A:
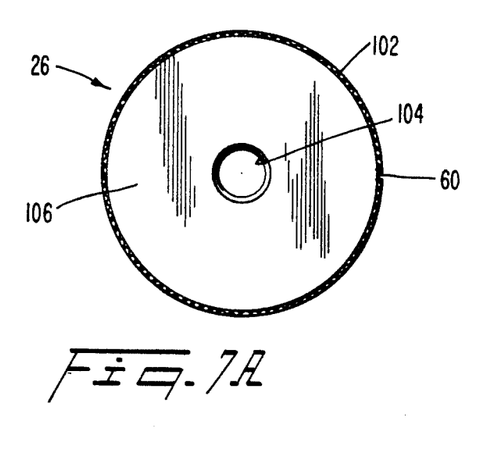
FIG. 7A shows a top view of a wheel with an axial hole.
Figure 7B:
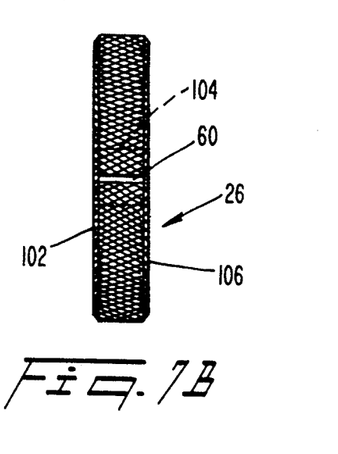
FIG. 7B shows a cross-sectional side view of the wheel.

In FIGS. 7A and 7B, the moving and locking means is embodied as a wheel 26 having a flat surface 106, a threaded axial hole 104, and a crosshatched outer circumferential edge 102. The crosshatched outer circumferential edge 102 may include a setting marker 60. In use, the crosshatching of the circumferential edge 102 permits a user to firmly grip and rotate the wheel 26, and the setting marker 60 indicates the angular position of the wheel 26 about the axis 65.

Figure 8B:
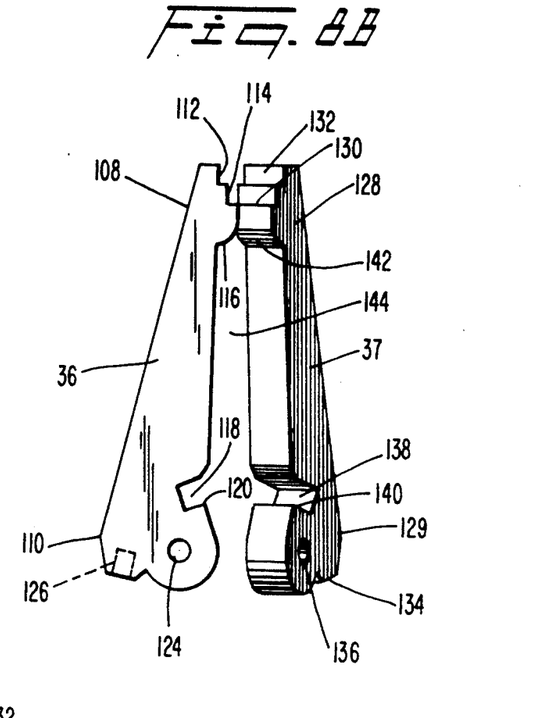
FIG. 8B shows a side view of an alternate embodiment of two gripper arms.
Figure 8C:
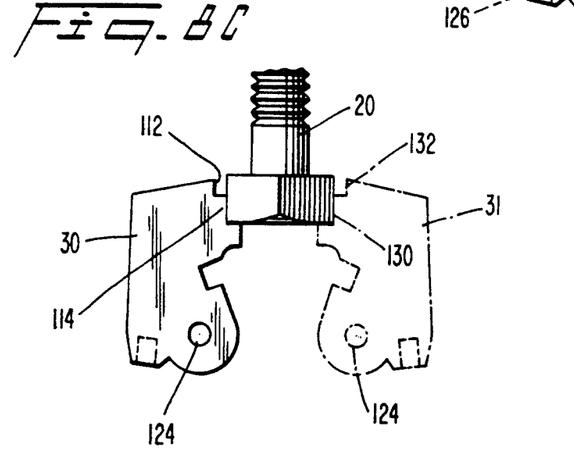
FIG. 8C illustrates a side view of two gripper arms holding a bolt.

As shown in FIG. 8C, the first surfaces 112, 132 of each gripper arm 30, 31, respectively, or the second surfaces 114, 130 of each gripper arm 30, 31, respectively, may engage the head of a bolt 20 such that each respective surface lies flush with and pressures the flat sides of the head of the bolt 20. The bolt 20 is positioned on either the first or the second surfaces of the gripper arms 30, 31, depending on the width of the head of the bolt 20, such as in the example of FIG. 8C, where the second surfaces 114, 132 of gripper arms 30, 31, respectively, fit and hold the bolt 20 as the keyless adjustable driver drives the bolt 20.

In an alternate embodiment, gripping means may be embodied as elongated gripper arms 36, 37 of FIG. 8B, where the upper portions 108, 128 of each gripper arm 36, 37, respectively, are elongated, with the gripper arms 36 and 37 tapering and narrowing from the lower portion 110, 129 to the upper portion 108, 128. With such elongated gripper arms 36, 37, the keyless adjustable driver may drive a bolt into recessed or narrow openings. Alternately, the keyless adjustable driver with such elongated gripper arms 36, 37 as shown in FIG. 8B may drive a nut 22 as in FIG. 2B, such as lug nuts, along the length of a bolt, with first surfaces 112, 132 or the second surfaces 114, 130 holding and driving the nut 22 onto a bolt as the length of the bolt moves through the space 144 between the gripper arms 36, 37.

Figure 9A:
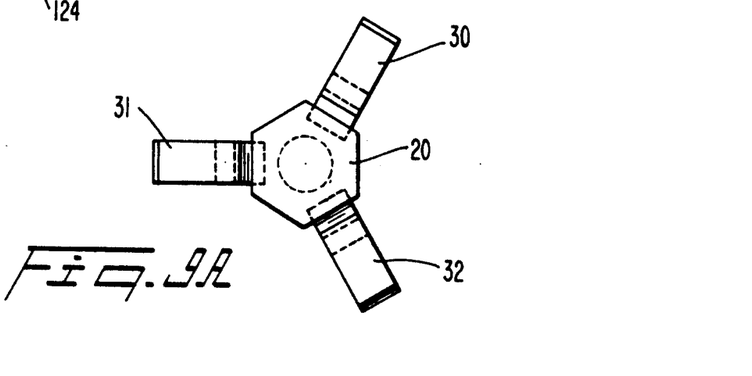
FIGS. 9A-9C illustrate top views of three gripper arms holding a bolt or a nut.

In an embodiment of the invention, the gripping means includes at least two gripper arms 30, 31 for holding and driving a bolt, as shown in FIGS. 10A-10E, but a greater number of gripper arms, which may be equally angularly positioned about the axis 65 of the keyless adjustable driver, may be provided to add greater stability to a bolt as the bolt is held and driven by the keyless adjustable driver, with the axis of the bolt aligned with the axis 65 of the keyless adjustable driver. In the preferred embodiment, as shown in FIG. 9A, three gripper arms 30, 31, 32 are equally angularly positioned about a bolt 20 for the conjunction of the three gripper arms 30, 31, 32 to hold and drive the bolt 20. In this example, the bolt 20 is a hex bolt, i.e. the head of the bolt has six sides.

Figure 9B:
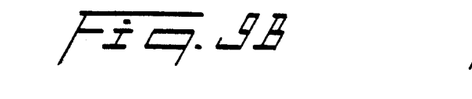
Figure 11A:
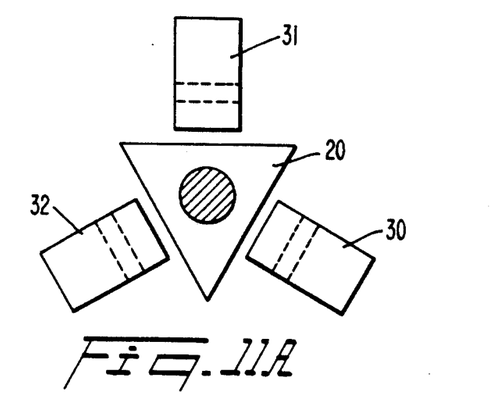

As shown in FIGS. 8A and 8B, in the preferred embodiment of the gripping means, each of the three gripper arms 30, 31, 32 has a first surface and a second surface, with both the first surface and the second surface being planar to lie flush with and to pressure the planar sides of a bolt 20, as in FIG. 9A, or the planar sides of a nut 22, as in FIG. 9B. Such a preferred embodiment would similarly hold and drive a three sided bolt, as illustrated in FIG. 11A.

Figure 10A:
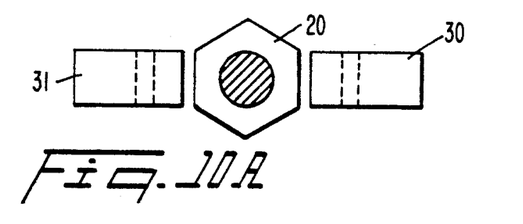
FIGS 10A-10E illustrate top views of various embodiments of two gripper arms holding various bolts or nuts.
Figure 10B:
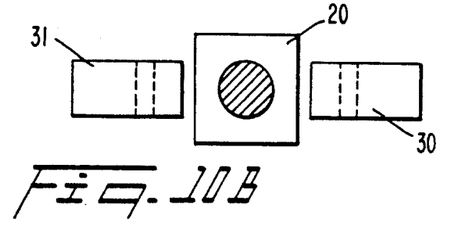
Figures 10C, 10D, 10E, 11B, 11C:
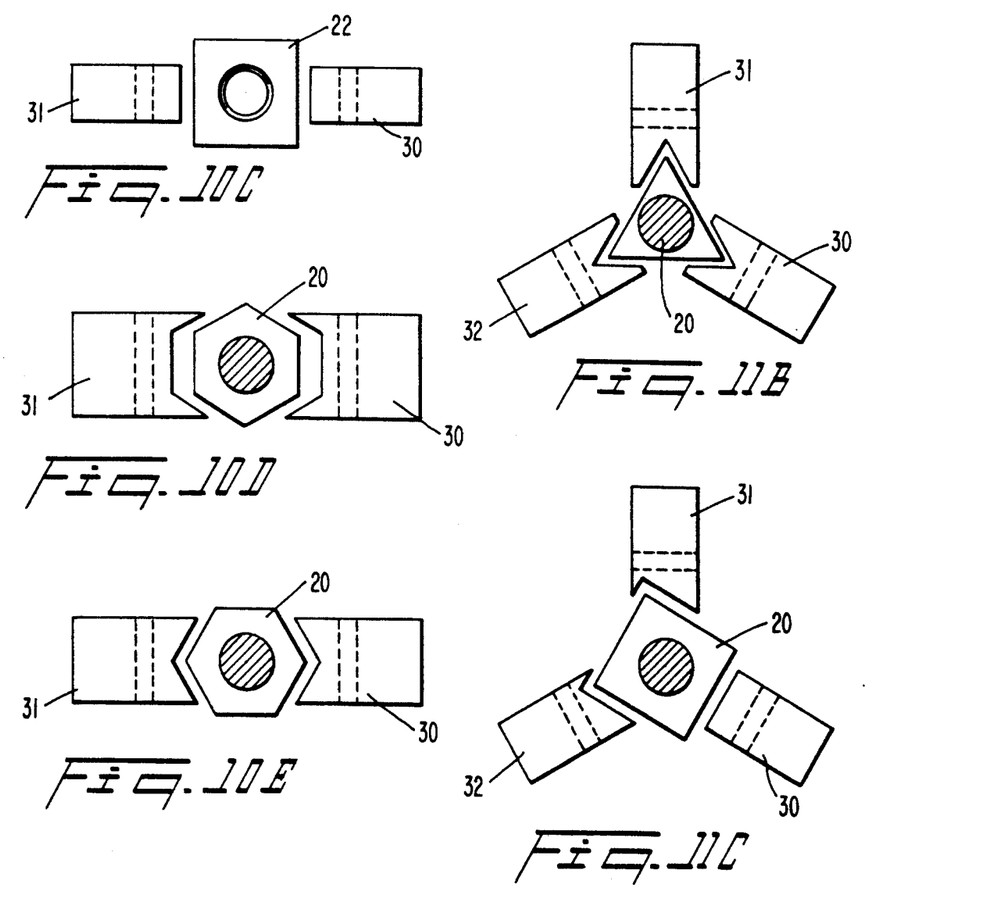
FIGS. 11A-11C illustrate top views of various embodiments of three gripper arms holding various bolts or nuts.

Other embodiments of the gripping means include using two gripper arms 30, 31, 32 diametrically opposite each other, as shown in FIGS. 10A-10C, where each gripper arm 30, 31 has a first surface and a second surface, with the first and second surfaces each being planar surfaces to lie flush with and to pressure the flat sides of a bolt 20 or a nut 22. Such an embodiment of two gripper arms can hold and drive any bolt with a head having an even number of flat sides. Similarly, further embodiments of the gripping means include using four gripper arms 30, 31, 32, 33 equally angularly spaced about the axis 65 of the keyless adjustable driver, with planar first and second surfaces, as shown in FIGS.

Figure 12A:
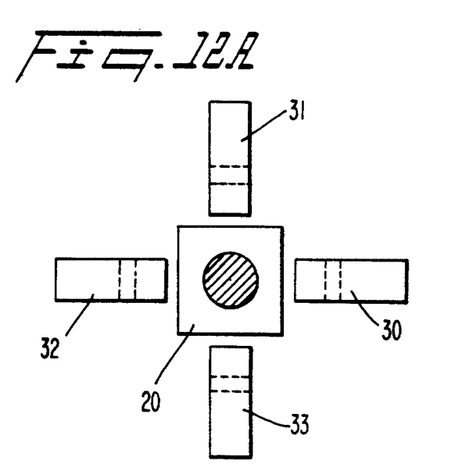
FIGS. 12A-12C illustrate top views of various embodiments of four gripper arms holding various bolts or nuts.
Figure 12B:
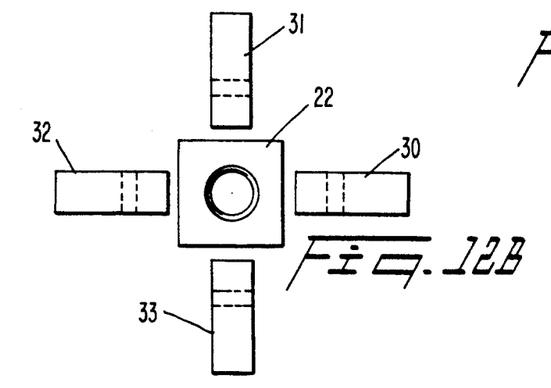
Figure 13A:
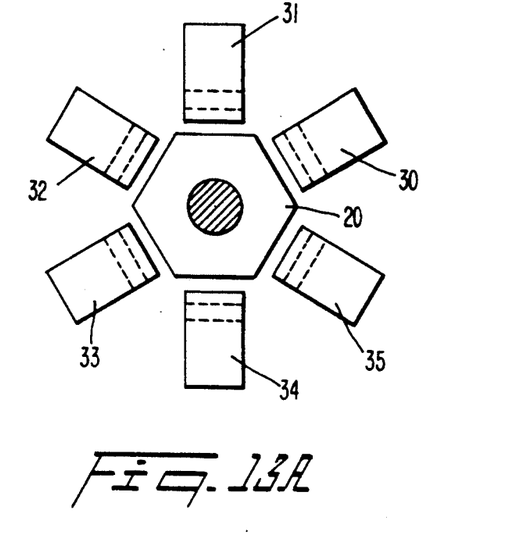
FIGS. 13A-13B illustrate top views of various embodiments of six gripper arms holding bolts.

12A-12B, for holding and driving a four sided bolt. A further embodiment of the gripping means includes using six gripper arms 30, 31, 32, 33, 34, 35 equally angularly spaced about the axis 65 of the keyless adjustable driver, with planar first and second surfaces, as shown in FIG. 13A, where each of gripper arms 30, 31, 32, 33, 34, 35 lies flush with and pressures one of the six sides of a hex bolt, thus providing great stability as the bolt is held and driven.

Additional embodiments of the gripping means may include gripper arms, equally angularly spaced about the axis 65 of the keyless adjustable driver, with upper portions having first and second surfaces with each of the first and second surfaces including fixed concave angles to securely fit the flat sides and corners of a bolt.

The concave angle required for each first and second surface of each gripper arm depends on the number of sides of the head of the bolt to be driven. For gripper arms which are equally angularly positioned about the axis of the keyless adjustable driver, for a bolt having a head with m sides, and for each gripper arm to be identical in shape, the required concave angle for the first and second surface of each gripper arm equals $$\frac{180(m - 2)}{m} \text{ degrees}$$

so that a bolt having an axis aligned with the axis 65 of the keyless adjustable driver will be held by each gripper arm at the corners and the sides of the bolt.

Figure 9C:
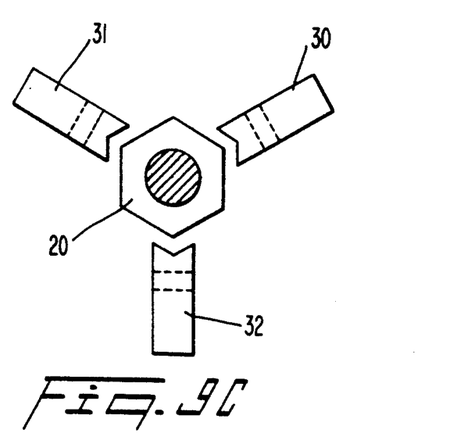
Figure 12C:
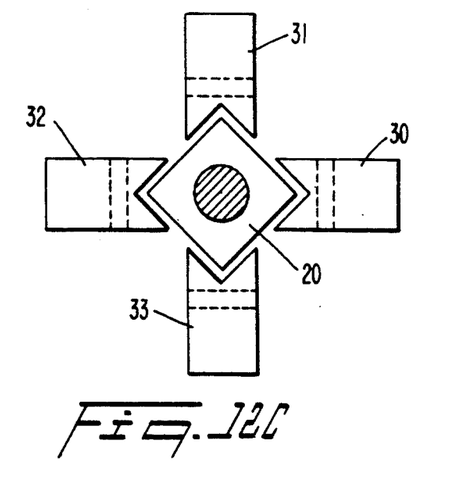
Figure 13B:
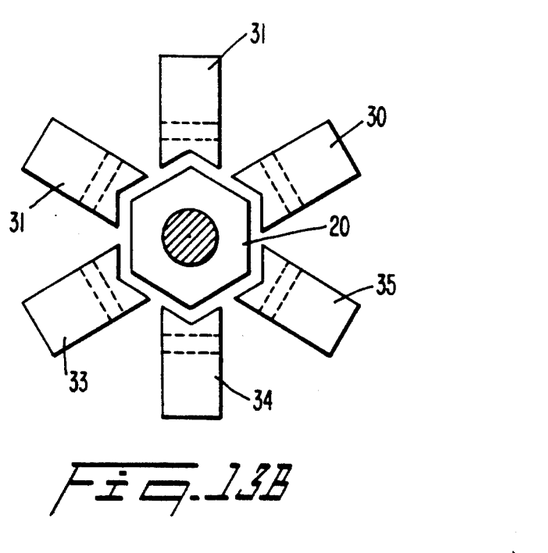

Accordingly, as illustrated in FIG. 9C, for a hex bolt, each of three gripper arms 30, 31, 32 would require a concave angle of 120 degrees each to lie flush with and to pressure two sides and a corner of the hex bolt. Similarly, further embodiments of two gripper arms and six gripper arms, with each gripper arm having a concave angle of 120 degrees, would similarly hold a hex bolt, as shown in FIGS. 10E and 13B, respectively. Still further embodiments may include three gripper arms each having a concave angle of 60 degrees to hold and drive a three sided bolt, as shown in FIG. 11B, while four gripper arms each having a concave angle of 90 degrees would hold and drive a four sided bolt, as shown in FIG. 12C.

However, further embodiments of the gripping means may include non-identical gripper arms, where some of the gripper arms include first and second surfaces having concave angles, in accordance with the above formula for the required concave angle, while other gripper arms have planar first and second surfaces, as illustrated in FIG. 11C, where, in this example, two gripper arms 31, 32 each have 90 degree concave angles, while the third gripper arm 30 has a planar surface. Additional embodiments of the gripping means may include gripper arms with first and second surfaces shaped to lie flush with and to pressure more than one side of the head of a bolt, in order to firmly hold the bolt as the bolt is driven, as illustratively shown in FIG. 10D.

The keyless adjustable driver may have mounting means engaging the cylindrical body 40 and engaging the gripping means for mounting the gripping means to the cylindrical body 40, as shown in FIG. 1, and for dismounting the gripping means from the cylindrical body 40, as shown in FIG. 3. In the preferred embodiment, as shown in FIGS. 1 and 3, the mounting means may be embodied as cylindrical posts 46, 47, 48 and screws 50, 51, 52 which mount the gripping means, embodied as gripper arms 30, 31, 32, to the cylindrical body 40 by having the gripper arms 30, 31, 32 positioned in the radial slots 92, 93, 94 such that the circular hole of each of gripper arms 30, 31, 32 is aligned with a respective one of tubular post holes 42, 43, 44, with a respective one of posts 46, 47, 48 passes through the respective one of tubular post holes 42, 43, 44 and through the circular hole 124 of each of gripper arms 30, 31, 32. In the preferred embodiment, as each of gripper arms 30, 31, 32 is positioned in a respective one of radial slots 92, 93, 94 which are equally angularly spaced on the cylindrical body 40 about the axis 65, the gripper arms 30, 31, 32 are accordingly equally angularly spaced about the axis 65.

Figure 6A:
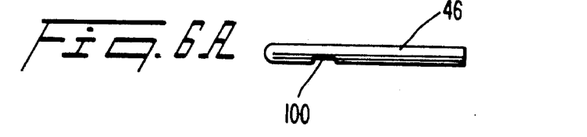
FIG. 6A shows a side view of a post.
Figure 6B:
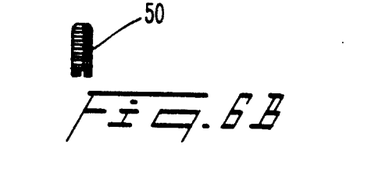
FIG. 6B shows a side view of a screw.

Each one of posts 46, 47, 48 includes an indentation. For example, as illustrated in FIG. 6A, a post 46 has a rectangular indentation 100, so that a screw 50, as illustrated in FIG. 6B, may fit in the indentation 100. With each of posts 46, 47, 48 positioned in a respective one of tubular post holes 42, 43, 44 and through the circular hole of each gripper arm 30, 31, 32, each of screws 50, 51, 52 are screwed into a respective screw hole 56, 57, 58 so that each screw 50, 51, 52 tightens against the indentation of each one of posts 46, 47, 48, thus securing each of posts 46, 47, 48 inside a respective one of tubular post holes 42, 43, 44 of the cylindrical body 40, as shown in FIG. 1.

With the posts 46, 47, 48 each secured by a respective screw 50, 51, 52, the gripping means, embodied as gripper arms 30, 31, 32, engages the cylindrical body 40 and thus revolves about axis 65 as the entire cylindrical body 40 rotates about axis 65 due to key 66 and keyway 88 by rotation of the central shaft 24 by rotation to the attached chuck and drill.

In alternate embodiments, as the keyless adjustable driver includes a plurality of gripper arms, the cylindrical body 40 has a plurality of tubular post holes, a plurality of screw holes, and a plurality of radial slots, so that the cylindrical body 40 has a respective tubular post hole, a respective screw hole, and a respective radial slot for each of the plurality of gripper arms. Such alternate embodiments of the keyless adjustable driver similarly may have the gripper arms and corresponding radial slots of the cylindrical body 40 equally spaced about the axis 65 of the keyless adjustable driver.

Additionally, by embodying the mounting means as screws and posts, part or all of the gripping means may be dismounted and removed from the cylindrical body 40 by the user. In this manner, individual gripper arms can be replaced if damaged. Furthermore, gripper arms with different shaped first and second surfaces, as set forth in the foregoing disclosure, can be substituted so that the keyless adjustable driver can hold and drive bolts with heads having a different number of flat sides. For example, gripper arms to fit a hex bolt can be substituted onto the keyless adjustable driver upon removal of gripper arms to fit, for example, bolts with four sided heads, and vice versa.

Similarly, the preferred embodiment of the mounting means using removable screws and removable posts permits elongated gripper arms, for example, as shown in FIG. 8B, to be substituted for shorter gripper arms, for example, as shown in FIG. 8A, and vice versa. With such mounting means and the capability to interchange gripper arms, the keyless adjustable driver is versatile as the keyless adjustable driver is not limited to driving one type of bolt, such as hex bolts.

The keyless adjustable driver may include gripping means rotatably pivotally engaging the mounting means. In the preferred embodiment, with the mounting means having posts 46, 47, 48 to mount the gripping means, embodied as gripper arms 30, 31, 32, such gripper arms 30, 31, 32 rotatably pivotally engage the posts 46, 47, 48, and, as the posts 46, 47, 48 are secured to the cylindrical body 40 by screws 50, 51, 52, the gripper arms 30, 31, 32 are thus rotatably and pivotally connected to the cylindrical body 40. Accordingly, rotation of the cylindrical body 40 about axis 65 revolves gripper arms 30, 31, 32 about axis 65.

The keyless adjustable driver may include spring means, engaging the cylindrical body 40 and the gripping means 30, 31, 32, for applying pressure to the gripping means, to rotatably pivot the gripping means towards the axis 65 of the keyless adjustable driver. With the gripping means embodied as a plurality of gripper arms 30, 31, 32, the spring means may be embodied as a plurality of springs 150, 151, 152, as illustrated in FIG. 3, with each of the plurality of springs 150, 151, 152 engaging a corresponding one of the plurality of gripper arms 30, 31, 32.

With three gripper arms 30, 31, 32, each one of three springs 150, 151, 152 is positioned in a respective one of lower spring holes 97, 98, 99 to engage the cylindrical body 40 with the axis of each of springs 150, 151, 152 parallel to the axis 65 of the cylindrical body 40, and, upon positioning each of the three gripper arms 30, 31, 32 in a respective radial slot 92, 93, 94 for mounting the gripper arms 30, 31, 32 to respective posts 46, 47, 48, each one of the three springs 150, 151, 152 engages a corresponding spring slot in a respective one of gripper arms 30, 31, 32. Other embodiments of the spring means may also be used to rotatably pivot the gripper arms 30, 31, 32 toward the axis 65.

The keyless adjustable driver may include attaching means, embodied as central shaft 24, engaging gripping means, embodied as n gripper arms 30, 31, 32, with n greater than 1, such that a movement of the central shaft 24 in either of two directions along the axis 65 of the keyless adjustable driver rotatably pivots each of the gripper arms on the mounting means towards the axis 65 for at least one of the plurality of surfaces of each of the n gripper arms 30, 31, 32 to lie flush with and to pressure one of the plurality of flat sides of the head of the bolt for holding the bolt.

With the central shaft 24 extending through the lower axial hole 86 and the upper axial hole 96 of the cylindrical body 40, and with each of the gripper arms 30, 31, 32 positioned and rotationally pivotally mounted in a respective one of radial slots 92, 93, 94, the head 72 and lower edge 74 of the central shaft 24 is positioned within the mouth of each of the gripper arms 30, 31, 32 such that the lower edge 74 of the central shaft 24 overlaps the second edge of each of the gripper arms 30, 31, 32.

Depending on the chirality of threading of the threaded axial hole 104 of the wheel 26 and of the screw-threads 80 of the central shaft 24, a first rotation of the wheel 26 about the central shaft 24 screws the wheel 26 along the central shaft 24 until the flat surface 90 of the wheel 26 lies flush with the flat base 90 of the cylindrical body 40, as illustrated in FIG. 1. A second rotation of the wheel 26 in the same direction as the first rotation causes the wheel 26, which remains flush with the flat base 90, to screw the central shaft 24 such that the head 72 and lower edge 74 of the central shaft 24 moves towards the flat base 90 of the cylindrical body 40. With the head 72 and lower edge 74 positioned within each mouth of each of the gripper arms 30, 31, 32, such movement of the head 72 and lower edge 74 toward the flat base 90 of the cylindrical body 40 causes the lower edge 74 to engage and put pressure on each second edge of each gripper arms 30, 31, 32, which results in each of gripper arms 30, 31, 32 rotatably pivoting about posts 46, 47, 48 toward the axis 65. As more screwing pressure is put on the central shaft 24 to move toward the flat base 90 by the user further turning the wheel 26 in the second rotation, the gripper arms 30, 31, 32 grip a bolt 20 by one of the first surfaces and the second surfaces lying flush with the flat sides of the head of the bolt 20, and put pressure on the head of bolt 20, resulting in locking the gripper arms 30, 31, 32 in one of a plurality of adjustable settings, as shown in FIG. 1.

In locking the gripper arms 30, 31, 32, the achieved position of the central shaft 24 and the achieved setting from the plurality of adjustable settings of the gripper arms 30, 31, 32 depends on the size of the head of the bolt 20 held by the gripper arms 30, 31, 32, and the wheel 26 cannot continue the second rotation due to the resistance of the head of the bolt 20 to further pressure by the keyless adjustable driver. As illustrated in FIGS. 1, 3, and 5C, the keyless adjustable driver may include a plurality of setting indicators, such as, by way of example, setting indicators 61, 62, and 64, located on the outer surface of the cylindrical body 40 which may correspond, for example, to settings for ¾ inch, ½ inch, and 7/16 inch lag bolts, respectively. Such setting indicators may include using a graduated scale of indicators in English and/or metric units, and such setting indicators may be etched into the outer surface, affixed to the outer surface, or placed on the outer surface of the cylindrical body by other means. In addition, as illustrated in FIGS. 1 and 7A, the wheel 26 may include a setting marker 60, located on the outer circumferential edge 102, for aligning with one of the plurality of setting indicators 61, 62, 64 on the outer surface of the cylindrical body 40 to indicate the locking of the grippers arms 30, 31, 32 in the one of the plurality of adjustable settings. In the preferred embodiment, the setting marker is embodied as an etched groove 60, but other embodiments of setting marker 60 may be used, such as etching or affixing a different form of setting marker 60 to the outer circumferential edge 102 of the wheel 26.

A third rotation of the wheel 26 in the opposite direction of the first and second rotation of the wheel 26 screws the central shaft 24 such that the head 72 and lower edge 74 moves away from the flat base 90, which releases the pressure of the lower edge 74 on each second edge of each of gripper arms 30, 31, 32, so that the pressure of the gripper arms 30, 31, 32 on the held bolt 20 is released, allowing the head of the bolt 20 to slip free of the gripper arms 30, 31, 32.

The keyless adjustable driver may be manufactured to a hand-held size, allowing the keyless adjustable driver to be hand-held and portable for attachment to handheld drills.

In use, the user attaches the keyless adjustable driver to a drill by attaching and securing the lower portion 82 of the central shaft 24 to a chuck on a drill. Once secured on the chuck, the driver may be adjusted to hold any size bolt in the gripper arms 30, 31, 32 without the use of a key.

Once secured on the chuck, the user holds the cylindrical body 40 in one hand while rotating the wheel 26 in the third rotation direction until the lower edge 74 of the central shaft 24 releases pressure on the second edge 120 of each one of the gripper arms 30, 31, 32, and each gripper arm 30, 31, 32 is then free to pivot toward or away from the axis 65, so the loose gripper arms 30, 31, 32 may accept the head of a bolt of any size.

Holding the cylindrical body 40 in one hand, the user moves one or more of the gripper arms 30, 31, 32 with the other hand or with the head of a bolt, and places the head of the bolt into the middle of the gripper arms 30, 31, 32 such that the flat sides of the head of the bolt 20 contact either the first surface or the second surface of each of the gripper arms 30, 31, 32, depending on the size of the head of the bolt 20. While the gripper arms 30, 31, 32 are loose, each of the springs 150, 151, 152 pivots a respective gripper arm 30, 31, 32, causing the first surface or the second surface of each gripper arm 30, 31, 32 to lie flush with a flat sides of the head of the bolt. The springs 150, 151, 152 also provide some pressure to hold the bolt between gripper arms 30, 31, 32. With the head of the bolt positioned between the first surfaces or the second surfaces of the gripper arms 30, 31, 32, the axis of the bolt is aligned with the axis 65 of the keyless adjustable driver.

Holding the cylindrical body 40 in one hand, the user rotates the wheel 26 in the direction of the first rotation, opposite the direction of the third rotation of the wheel 26, so that the wheel 26 screws along the screw-threads 80 of the central shaft 24 until the flat surface 90 of the wheel 26 lies flush with the flat base 90 of the cylindrical body 40. The user then rotates the wheel 26 in the second rotation, which is in the same direction of the first rotation, so that the wheel 26, being flush with the flat base 90 of the cylindrical body 40, causes the central shaft 24 to screw along the threaded axial hole 104 of the wheel 26, causing the central shaft 24 to move along the lower axial hole 86 such that the head 72 and the lower edge 74 of the central shaft 24 move toward the flat base 90 of the cylindrical body 40.

Such movement of the lower edge 74 causes the lower edge 74 to engage and to pressure the second edge of each of the gripper arms 30, 31, 32, causing each gripper arm 30, 31, 32 to pivot towards the axis 65 and towards a respective flat side of the bolt 20. With further turning of the wheel 26 in the second rotation, the gripper arms 30, 31, 32 lie flush with and put pressure against the head of the bolt 20, until the bolt is firmly held in a setting of the combination of gripper arms 30, 31, 32. With the bolt firmly held, the wheel 26 cannot be turned further, which locks the central shaft 24 in the achieved position and locks the gripper arms 30, 31, 32 in the achieved setting and which causes a setting marker 60 on the wheel 26 to align with one of a plurality of setting indicators 61, 62, 64 affixed to the cylindrical body 40 to indicate the size of the bolt held and/or the setting of the gripper arms 30, 31, 32, depending on the size of the bolt.

As illustrated in FIG. 1, once a bolt 20 is locked firmly in the gripper arms 30, 31, 32 of the keyless adjustable driver, the user, holding the drill and the attached keyless adjustable driver in one or two hands, may direct the tip or end of the bolt 20 to the desired location on a wall, a deck, or the like, or similarly the user may direct a nut or lug nut held by the gripper arms 30, 31, 32 onto the end of a bolt or the like. With the held bolt or nut in position for driving, the user then holds and operates the drill in one hand, and optionally uses his/her other hand to hold and guide the keyless adjustable driver as the drill and attached keyless adjustable driver drive the held bolt or nut. As the drill operates, the rotation of the central shaft 24 by the drill and chuck rotates the cylindrical body 40 of the driver, since the key 66 engages the keyway 88 of the cylindrical body. As the cylindrical body 40 rotates, the gripper arms 30, 31, 32, holding the bolt or nut, revolve about the axis 65, which rotates and drives the bolt or nut.

Upon completing the driving of the bolt or nut, the user rotates the wheel 26 in the third rotation which screws the central shaft 24 such that the lower edge 74 of the central shaft 24 moves away from the flat base 90 of the cylindrical body 40, releasing the pressure on the second edge of each of the gripper arms 30, 31, 32 to allow each of the gripper arms 30, 31, 32 to pivot away from the driven bolt or nut to release the driven bolt or nut from the gripper arms.

The use of removable screws 50, 51, 52 and removable posts 46, 47, 48 as mounting means permits the keyless adjustable driver to be easily assembled from the constituent parts, as well as disassembled to replace some or all of the constituent parts, such as the gripper arms 30, 31, 32 which may be dismounted and removed from the cylindrical body 40. In this manner, individual gripper arms can be replaced if damaged. Furthermore, gripper arms with different shaped first and second surfaces, as set forth in the foregoing disclosure, can be substituted so that the keyless adjustable driver can hold and drive bolts with heads having a different number of flat sides. For example, gripper arms to fit a hex bolt can be substituted onto the keyless adjustable driver upon removal of gripper arms to fit, for example, bolts with four sided heads, and vice versa.

Similarly, the preferred embodiment of the mounting means using screws and posts permits elongated gripper arms, for example, as shown in FIG. 8B, to be substituted for shorter gripper arms, for example, as shown in FIG. 8A, and vice versa. With such mounting means and the capability to interchange gripper arms, the keyless adjustable driver is versatile as the keyless adjustable driver is not limited to driving one type of bolt, such as hex bolts, and may be used in various applications.

It will be apparent to those skilled in the art that various modifications can be made to the keyless adjustable driver of the instant invention without departing from the spirit or scope of the invention, and it is intended that the present invention cover modifications and variations of the keyless adjustable driver provided they come within the scope of the appended claims and their equivalents.

I claim:

1. A keyless adjustable driver, attachable to a chuck on a drill, having a plurality of adjustable settings for holding and driving bolts of any size having a head with a plurality of flat sides, comprising:

a wheel, having a threaded axial hole, having a cross-hatched outer circumferential edge;

a cylindrical body having a flat base, said cylindrical body having three radial slots equally angularly spaced about an axis of the cylindrical body, each radial slot including a lower spring hole, said cylindrical body having three tubular post holes, with each tubular post hole extending from one side of an outer surface to another side of the outer surface of said cylindrical body along a chord of said cylindrical body, said cylindrical body having three screw holes, each screw hole extending from an outer surface of said cylindrical body along a chord of said cylindrical body and each screw hole terminating in the interior of said cylindrical body at a respective tubular post hole, said cylindrical body having a lower axial hole and having an upper axial hole, with the upper axial hole having a diameter greater than the diameter of the lower axial hole, and having a keyway extending along the lower axial hole;

three springs, each of said springs positioned in one of the lower spring holes of the radial slots of said cylindrical body, each of said springs having an axis parallel to the axis of said cylindrical body;

three posts, each of said posts positioned in a respective one of the three tubular post holes of said cylindrical body, each of said posts having an indention;

three screws, each of said screws positioned in a respective one of the three screw holes of said cylindrical body for engaging the indentation of one of the respective three posts to secure the respective post in the respective tubular post holes;

a central shaft having an upper portion with a head at an upper end and a key protruding from a lower end, the head having a lower edge, the key slidably engaging to the keyway of said cylindrical body allowing said central shaft to move in a first and a second of two directions, said central shaft having a screw-threaded middle portion, and the central shaft having a lower portion for attaching to a chuck;

three gripper arms, each of said gripper arms positioned in one of the equally angularly spaced radial slots of said cylindrical body, each of said gripper arms having an upper portion having a first surface and a second surface, one of the first surface and the second surface of each of said gripper arms, responsive to the size of the head of the bolt, lies flush with and puts pressure on the head of the bolt, each of said gripper arms having a first edge, each of said gripper arms having a lower portion having a spring slot for positioning one of said gripper arms over a respective one of said springs, each of said gripper arms responsive to a respective one of said springs for pivoting towards the axis of said cylindrical body, the lower portion of each of said gripper arms having a semi-circular flange having a second edge forming a mouth with the first edge of the upper portion, the semi-circular flange having a circular hole for extending one of said posts through the circular hole for rotatably pivotally engaging each one of said gripper arms to said cylindrical body by a respective one of said posts, each said gripper arms, responsive to a removal of a corresponding one of said screws from the screw holes of the cylindrical body and a removal of a corresponding one of said posts from said cylindrical body through the post holes of said cylindrical body, disengaging from said cylindrical body;

wherein said central shaft extends through the upper axial hole and the lower axial hole of said cylindrical body, the head of the central shaft positioning in the mouth of each of said gripper arms, the lower portion of said central shaft passing through the threaded axial hole of said wheel, the threaded axial hole of said wheel rotatably engaging the screw-threaded middle portion of said central shaft in a screw engagement for rotating the wheel in a first rotation of the wheel to thread the wheel along the threaded middle portion of said central shaft and to flush the wheel against the flat base of said cylindrical body, and for sliding the central shaft, responsive to a second rotation of the wheel, along the keyway of said cylindrical body due to the screw engagement with said wheel to move the head of said central shaft towards the flat base of said cylindrical body, the lower edge of the head of said central shaft putting a pressure against the second edge of the semi-circular flange of each of said gripper arms, thereby rotatably pivoting each of said gripper arms towards the axis and towards the head of the bolt for placing and increasing a pressure on the head of the bolt to grip the bolt and for locking said gripper arms into one of the plurality of adjustable settings; and wherein said central shaft, responsive to a third rotation of the wheel, slides along the keyway of said cylindrical body due to the screw engagement with said wheel, thereby moving the head of said central shaft away from the flat base of the cylindrical body, thereby releasing the pressure on the second edge of the semi-circular flange on each of said gripper arms, wherein each of said gripper arms, responsive to the releasing of the pressure of the second edge of each of said gripper arms, releases the pressure on the head of the bolt, allowing the release of the head of the bolt from the driver.

2. The keyless adjustable driver as set forth in claim 1, wherein said cylindrical body is made of aluminum.

3. The keyless adjustable driver as set forth in claim 1, further comprising:
a plurality of setting indicators located on said cylindrical body; and
a setting marker, located on said wheel, responsive to the second rotation of said wheel, for aligning with one of said plurality of setting indicators to indicate the locking of said gripper arms in the one of a plurality of adjustable settings.

4. An apparatus, attachable to a chuck on a drill, having a plurality of adjustable settings, for holding and driving a bolt of any size having a head with a plurality of flat sides, comprising:
a cylindrical body having an axis;
means, including screw-like threads, for attaching the apparatus to the chuck;
moving means, includes a wheel having a threaded axial hole, said moving means engaging the screw-like threads of said attaching means in a screw engagement by the threaded axial hole, for moving said attaching means in two directions to each of the plurality of settings;
gripping means, engaging said attaching means, responsive to the moving of said attaching means in a first of the two directions, for changing settings for fitting, for gripping, and for holding the head of the bolt in the plurality of settings, said gripping means, responsive to the moving of said attaching means in a second of two directions, for changing settings for releasing the head of the bolt;
mounting means, engaging said cylindrical body and engaging said gripping means, for removably mounting said gripping means to said cylindrical body; and
wherein said gripping means rotatably pivotally engages said mounting means.

5. The apparatus as set forth in claim 4, further comprising spring means, engaging said cylindrical body and engaging said gripping means, for applying a pressure to said gripping means, thereby rotatably pivoting said gripping means towards the axis of the apparatus.

6. The apparatus as set forth in claim 5, wherein said gripping means includes n gripper arms, n is greater than 1, each of the n gripper arms having a plurality of surfaces, each of the n gripper arms, responsive to a movement of said attaching means in one of the two directions, rotatably pivoting on said mounting means towards the axis of said cylindrical body, thereby moving at least one of said plurality of surfaces of each of the n gripper arms to lie flush with and to pressure one of the plurality of flat sides of the head of the bolt, thereby holding the bolt.

7. The apparatus as set forth in claim 6, wherein the n gripper arms, n is greater than 1, are equally angularly spaced about the axis of said cylindrical body.

8. The apparatus as set forth in claim 7, wherein said spring means includes n springs, each of the n springs engaging a respective one of the n gripper arms.

9. The apparatus as set forth in claim 8, wherein said cylindrical body further includes an axial hole and a keyway extending along the axial hole, and wherein said attaching means, passing through the axial hole of said cylindrical body further includes a key, protruding from a side of said attaching means, for slidably engaging the keyway of the cylindrical body, thereby allowing said attaching means to move in the two directions along the axial hole and providing a rotational motion to said cylindrical body in concert with a rotational motion of said attachment means due to a rotational motion of the chuck on the drill.

10. The apparatus as set forth in claim 9, wherein a first surface and the second surface of the plurality of surfaces of each of said gripper arms are planar for lying flush with and pressuring one of the plurality of flat sides of the head of a bolt.

11. The apparatus as set forth in claim 9, wherein the first surface and the second surface of each of said gripper arms each include a 120 degree concave angle for lying flush with and pressuring two sides and a corner of the head of a hex bolt, thereby holding the hex bolt.

12. The apparatus as set forth in claim 9 wherein each of the plurality of surfaces is planar for lying flush with and pressuring one of the plurality of flat sides of the head of a bolt, thereby holding the bolt.

13. The apparatus as set forth in claim 9, wherein each of the plurality of surfaces includes a set of concave angles for each of the plurality of surfaces to lie flush with and to pressure more than one flat side of the head of the bolt, thereby holding the bolt.

14. The apparatus as set forth in claim 9, wherein each of the plurality of surfaces includes a concave angle of:

$$\frac{180(m-2)}{m} \text{ degrees}$$

where m equals the number of sides of the head of the bolt, for each of the plurality of surfaces to lie flush with and to pressure two sides and a corner of the head of a bolt, thereby holding the bolt.

15. The apparatus as set forth in claim 10, wherein n equals

16. The apparatus as set forth in claim 15, wherein said cylindrical body is made of aluminum.

17. The apparatus as set forth in claim 16, further comprising:
   a plurality of setting indicators located on said cylindrical body; and
   a setting marker, located on said moving and locking means, for aligning with one of said plurality of setting indicators to indicate the locking of said gripping means in the one of a plurality of adjustable settings.

* * * * *